United States Patent [19]

Mizobata et al.

[11] Patent Number: 5,241,880
[45] Date of Patent: Sep. 7, 1993

[54] CONTROL CABLE

[75] Inventors: Shinji Mizobata, Sanda; Haruhiko Furukawa, Ichihara, both of Japan

[73] Assignees: Nippon Cable System, Inc., Hyogo; Dow Corning Toray Silicone Co., Ltd., Tokyo, both of Japan

[21] Appl. No.: 933,018

[22] Filed: Aug. 20, 1992

Related U.S. Application Data

[63] Continuation of Ser. No. 651,085, Feb. 6, 1992, abandoned.

[30] Foreign Application Priority Data

Feb. 7, 1990 [JP] Japan .................................. 2-27673

[51] Int. Cl.$^5$ ................................................ F16C 1/10;
[52] U.S. Cl. .................................. 74/502.5; 428/379;
428/36.91; 523/213
[58] Field of Search ............... 74/502.4, 502.5, 502.6;
428/447, 423.1, 220, 36.91, 463, 412, 375, 379;
523/212, 213

[56] References Cited

U.S. PATENT DOCUMENTS

| | | | |
|---|---|---|---|
| 3,263,520 | 8/1966 | Tschanz | 74/502.5 |
| 3,936,572 | 2/1976 | Mackenzie, Jr. et al. | 428/379 |
| 4,150,013 | 4/1979 | Punderson | 260/42.26 |
| 4,344,669 | 8/1982 | Uchida et al. | 428/375 |
| 4,362,069 | 12/1982 | Giatras et al. | 74/502.5 |
| 4,541,303 | 9/1985 | Kuzunishi | 74/502.5 |
| 4,615,947 | 10/1986 | Goossens | 428/412 |
| 4,787,991 | 11/1988 | Morozumi et al. | 252/25 |
| 4,822,830 | 4/1989 | Adkins | 523/213 |
| 4,891,393 | 1/1990 | Hirai et al. | 523/212 |
| 4,898,046 | 2/1990 | Mancewicz et al. | 74/502.5 |
| 4,951,523 | 8/1990 | Shiota et al. | 74/502.5 |
| 4,990,490 | 2/1991 | Pathare et al. | 29/599 |

FOREIGN PATENT DOCUMENTS

| | | | |
|---|---|---|---|
| 1906635 | 8/1970 | Fed. Rep. of Germany . | |
| 57-10144 | 2/1982 | Japan . | |
| 0231009 | 11/1985 | Japan | 74/502.5 |
| 63-67042 | 12/1988 | Japan . | |
| 1207304 | 9/1970 | United Kingdom | 74/502.5 |
| 1473110 | 5/1977 | United Kingdom . | |

Primary Examiner—Carl D. Friedman
Assistant Examiner—Winnie Yip
Attorney, Agent, or Firm—Armstrong, Westerman, Hattori, McLeland & Naughton

[57] ABSTRACT

A control cable including a conduit having flexibility, the inside surface of which is fitted with a liner, and an inner cable having an inner coat, which is inserted into the conduit so that the inner cable slides slidden in the conduit. The liner is made of a thermoplastic resin dispersively containing 13 to 20% by weight of organopolysiloxane which in turn is made of 45 to 85% by weight of an organopolysiloxane having an ultra-high viscosity of which kinematic viscosity is 1,000,000 to 50,000,000 cSt at 25° C. and 55 to 15% by weight of an organopolysiloxane having a lower viscosity of which kinematic viscosity is 25 to 10,000 cSt at 25° C. The inner coat is made of a thermoplastic resin. The control cable shows excellent load efficiency and can be smoothly operated for a long period of time.

11 Claims, 1 Drawing Sheet

CONTROL CABLE

This application is a continuation of application Ser. No. 651,085, filed Feb. 6, 1992, now abandoned.

BACKGROUND OF THE INVENTION

The present invention relates to a control cable, and more particularly to a control cable excellent in load efficiency, and the inner cable of which being able to be smoothly operated for a long period of time.

A control cable fundamentally comprises a flexible conduit and a flexible inner cable which is inserted into the conduit so as to be freely slidden in and out, and is a means for remotely controlling a slave connected with the end of the inner cable by applying a pulling operation, a pushing and pulling operation or the combination thereof to another end of the inner cable. The control cable has been conventionally used in order to operate a transmission used in automobiles, autobicycles, bicycles and the like, a brake, a clutch, a speedmeter, and the like.

The inner cable usually comprises a stranded wire produced by twisting plural metallic wires or a stranded wire of which surroundings are coated with a synthetic resin or reinforced by twisting flat steel wires around the stranded wire. The conduit comprises, for instance, a coiled spring produced by winding one or plural flat steel wires or round steel wires in abutting convolutions and an outer coat made of a synthetic resin which covers the outside surface of the coiled spring.

However, in such a control cable, frictional resistance increases when the conduit is directly contacted with the inner cable. Therefore, in some cases, as diclosed in Japanese Patent Unexamined Publication No. 231009/1985, a flexible tubular liner made of a synthetic resin is formed on the inside surface of the conduit. As a material used in the liner, for instance, a synthetic resin such as polyethylene, polyoxymethylene, polybutylene terephthalate or polytetrafluoroethylene is used.

Also, a synthetic resin coating (hereinafter referred to as inner coat) is set on the outer surroundings of the inner cable. As a material for the inner coat, for instance, Teflon, 11-nylon and the like are used.

However, in such a control cable having the above-mentioned liner and inner coat, in order to diminish the sliding resistance between the liner and the inner cable, there is a necessity to use a synthetic oil such as silicone oil or olefin oil, a mineral oil, a grease of which basic ingredient is the above oil, or a lubricant such as oil or grease in which an antioxidant, a corrosion inhibitor, an extreme pressure additives and the like are added, between the inner cable and the conduit in consideration of the affection of the load efficiency [(given load/operation load)×100].

However, there are several problems, in the control cable in which a lubricant is used, such as difficulty of operation for coating because dispersion of the load efficiency of products is caused by the unevenness of a coating, rubbishes and dusts are easily adhered to the lubricant when applying the lubricant to the control cable, and drip and the like are generated.

Also, the durability of the above-mentioned control cable largely depends upon the lubricant. For instance, in case the shortage of lubricants is generated due to the long period use of the control cable, there are some problems that the liner is thoroughly worn down and the operationability of the control cable is excessively lowered, and the like.

The object of the present invention is to delete the above-mentioned disadvantages of conventional control cables and to provide a control cable which does not necessitate a lubricant to avoid a complex coating operation and which can be used with smooth sliding operation of the inner cable for a long period of time.

SUMMARY OF THE INVENTION

The control cable of the present invention comprises a conduit having flexibility, inside surface of which being fitted with a liner, and an inner cable having an inner coat, which is inserted into the conduit so that the inner cable free slides in the conduit. The liner comprises a thermoplastic resin dispersively containing 13 to 20% by weight of an organopolysiloxane and the organopolysiloxane comprises 45 to 85% by weight of an organopolysiloxane having an ultra-high viscosity of which kinematic viscosity is 1,000,000 to 50,000,000 cSt at 25° C. and 55 to 15% by weight of an organopolysiloxane having a lower viscosity of which kinematic viscosity is 25 to 10,000 cSt at 25° C. The inner coat comprises a thermoplastic resin.

DETAILED DESCRIPTION

Figure 1:
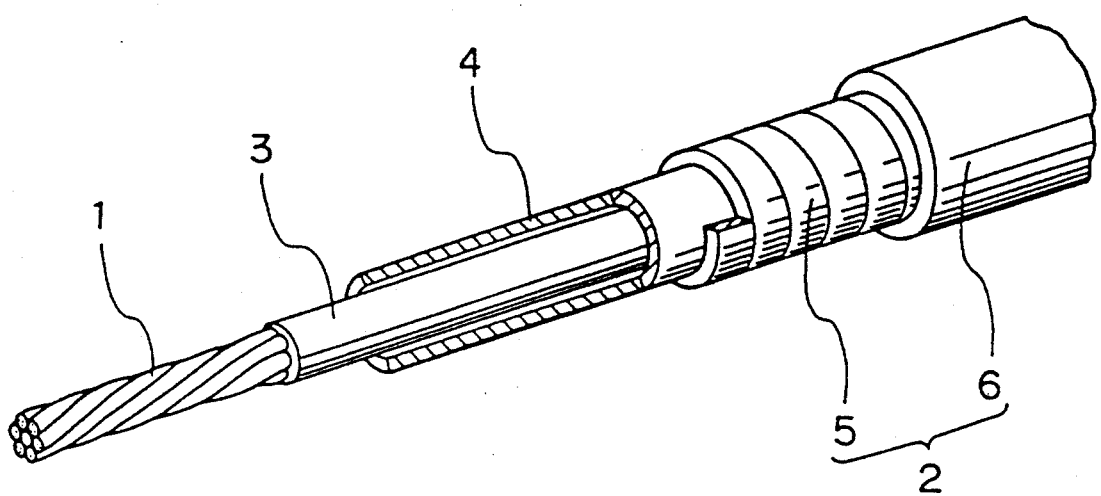
FIG. 1 is a partially-cut-off perspective view showing one embodiment of the control cable of the present invention.

In order to improve the load efficiency of a control cable without a lubricant, an organopolysiloxane is contained in a resin for a liner or an inner coat, and the organopolysiloxane extides from on the surface of the resin. It is preferable that the organopolysiloxane has a low viscosity so that the organopolysiloxane can easily extide from the resin. However, when a organopolysiloxane having too low a viscosity is contained in a large amount in the resin, there is a problem that the organopolysiloxane cannot be effectively extruded to produce a liner, and thus the molding cannot be carried out because of the slipping of the resin on the cylinder barrel in the extruder. On the other hand, a large amount of the organopolysiloxane having a high viscosity can be contained in the resin, and the molding can be carried out without slipping. However, when the viscosity of the organopolysiloxane is too high, the amount of the organopolysiloxane which is extided from the surface of the resin is little, and according the load efficiency and durability of the control cable cannot be improved sufficiently.

Accordingly, an organopolysiloxane having an ultra-high viscosity and an organopolysiloxane having a lower viscosity are used in the present invention in order to improve extruding stability during producing a liner and to sufficiently release these organopolysiloxanes on the surface of the resin sufficiently.

The control cable of the present invention comprises a conduit having flexibility, the inside surface of which being set up with a liner and an inner cable having an inner coat, and the inner cable is inserted into the conduit so that the inner cable freely slides in the conduit as mentioned above. In the above-mentioned liner, a thermoplastic resin containing 13 to 20% by weight of an dispersed in the resin, is used. The organopolysiloxane comprises 45 to 85% by weight of an organopolysiloxane having an ultra-high viscosity of which kinematic viscosity is 1,000,000 to 50,000,000 cSt at 25° C. and 55 to 15% by weight of an organopolysiloxane having a lower viscosity of which kinematic viscosity is 25 to 10,000 cSt at 25° C. In the above-mentioned inner coat, a thermoplastic resin is used.

In the present invention, since the organopolysiloxane having an ultra-high viscosity and the organopolysiloxane having a lower viscosity are dispersively contained in the thermoplastic resin used in the above-mentioned liner, it is of course that there is no necessity to use a lubricant between the interspace of the conduit and the inner cable, and an excellent function that the sliding operation of the conduit and the inner cable can be smoothly carried out for a long period of time, is exhibited.

Examples of the thermoplastic resin used in the above-mentioned liner are, for instance, polybutylene terephthalate, polyoxymethylene, polyamide represented by 1-nylon and 6,6-nylon, and the like, but the present invention is not restricted to the exemplified ones and other thermoplastic resins can be used as far as the object of the present invention can be accomplished. Among the above-mentioned thermoplastic resins, polybutylene terephthalate having a melt index of 0.1 to 5 g/10 minutes can be particularly preferably used because the change of load efficiency is small when the control cable is used for a long period of time. When the melt index of the polybutylene terephthalate is less than 0.1 g/10 minutes, it is difficult to produce a liner by means of an extruder, and when the melt index exceeds 5 g/10 minutes, there is a tendency that the liner is easily peeled off from the conduit due to the lack of toughness of the liner during forming the liner and that physical properties such as durability and abrasion resistance required for the liner are not easily exhibited.

Examples of the above-mentioned polybutylene terephthalate are, for instance, a homopolymer of butylene terephthalate, a copolymer of butylene terephthalate and other monomer such as ethylene terephthalate having a content of the other monomer of at most about 10% by weight, and the like. Also, the above-mentioned polybutylene terephthalate may contain a polymer such as polyester or polyether-ester within a scope that the object of the present invention is not inhibited in the present invention.

The terminology "melt index" is intended to mean a value when the melt index is measured in accordance with Method A of ASTM D 1238 in this specification.

The melt index of the above-mentioned polybutylene terephthalte is measured at a temperature of 250° C. under a load of 0.325 Kgf.

It is necessary that the kinematic viscosity of the organopolysiloxane having an ultra-high viscosity used in the above-mentioned liner is 1,000,000 to 50,000,000 cSt at 25° C. When the kinematic viscosity at 25° C. is less than 1,000,000 cSt, the organopolysiloxane is not sufficiently holded in the thermoplastic resin, and when the kinematic viscosity exceeds 50,000,000 cSt, since the organopolysiloxane shows rubber-like properties, handling such as kneading comes to be difficult and lubrication ability comes to be poor. It is particularly preferable that the kinematic viscosity of the above-mentioned organopolysiloxane having an ultra-high viscosity is 2,000,000 to 10,000,000 cSt at 25° C.

As the above-mentioned organopolysiloxane having an ultra-high viscosity, a linear organopolysiloxane, a branched organopolysiloxane and the like can be exemplified. The typical examples are, for instance, dimethylpolysiloxane, methylalkylpolysiloxane, methylphenylpolysiloxane, methylaminoalkylpolysiloxane, methylfluoroalkylpolysiloxane, and the like. Among them, dimethylpolysiloxane is particularly preferable from the viewpoint of lubricationability between the thermoplastic resin of the liner and that of the inner coat, thermal resistance, cost and the like.

As the organopolysiloxane having a lower viscosity used in the above-mentioned liner, an organopolysiloxane having a kinematic viscosity of 25 to 10000 cSt at 25° C. is used. When the kinematic viscosity is less than 25 cSt, the organopolysiloxane having a lower viscosity is evaporated in a short time, and the wear and tear of the liner are generated during the control cable is used. When the kinematic viscosity exceeds 10000 cSt, the organopolysiloxane does not bleed out from the thermoplastic resin sufficiently, and the load efficiency is lowered. It is preferable that the kinematic viscosity of the organopolysiloxane having a lower viscosity is 45 to 5500 cSt, particularly 50 to 5000 cSt at 25° C.

As the above-mentioned organopolysiloxane having a lower viscosity, a linear organopolysiloxane and a branched organopolysiloxane are cited. The representative examples of the organopolysiloxane having a lower viscosity are, for instance, dimethylpolysiloxane, methylalkylpolysiloxane, methylphenylpolysiloxane, methylaminoalkylpolysiloxane, methylfluoroalkylpolysiloxane, and the like. Among them, dimethylpolysiloxane is particularly preferable from the viewpoint of lubricationability between the thermoplastic resin of the liner and that of the inner coat, thermal resistance, cost, and the like.

The amounts of the organopolysiloxane having an ultra-high viscosity and the organopolysiloxane having a lower viscosity contained in the thermoplastic resin of the above-mentioned liner are adjusted so that the organopolysiloxane is composed of 45 to 85% by weight of the organopolysiloxane having an ultra-high viscosity and 55 to 15% by weight of the organopolysiloxane having a lower viscosity. When the content of the organopolysiloxane having an ultra-high viscosity is less that 45% by weight and the content of the organopolysiloxane having a lower viscosity is more that 55% by weight, an extruded product cannot be produced because a slide between a screw and a resin occurs in an extruder and the feed of the resin cannot be carried out. When the content of the organopolysiloxane having an ultra-high viscosity is more than 85% by weight and the content of the organopolysiloxane having a lower viscosity is less that 15% by weight, the effects do not differ much from the effects when the organopolysiloxane having an ultra-high viscosity is used solely, and the improvement of load efficiency is little. It is particularly preferable that the content of the organopolysiloxane having an ultra-high viscosity is 50 to 80% by weight and the content of the organopolysiloxane having a lower viscosity is 50 to 20% by weight.

The organopolysiloxane comprising the organopolysiloxane having an ultra-high viscosity and the organopolysiloxane having a lower viscosity is dispersively contained in the thermoplastic resin so that the content of the organopolysiloxane is 13 to 20% by weight. When the content of the organopolysiloxane is less than 13% by weight, the load efficiency is lowered when the control cable is used for a long period of time. When the content is more that 20% by weight, an extruded product cannot be produced because a slip of a resin occurs on a cylinder barrel in an extruder and the constant feed of the resin cannot be carried out. It is particularly preferable that the content of the organopolysiloxane is 15 to 18% by weight.

To the organopolysiloxane, for instance, an antioxidant, a corrosion inhibitor, extreme pressure additives and the like can be added as occasion demands. Also, the organopolysiloxane can be prepared to grease.

As to a method for containing the organopolysiloxane in the thermoplastic resin, there is no limitation. For instance, a method comprising ading the organopolysiloxane having an ultra-high viscosity and the organopolysiloxane having a lower viscosity separately to the thermoplastic resin while heating and kneading the thermoplastic resin and uniformly dispersing them, a method comprising adding the organopolysiloxane, which is previously prepared by mixing the organopolysiloxane having an ultra-high viscosity and the organopolysiloxane having a lower viscosity in a prescribed proportion, to the melted thermoplastic resin and uniformly dispersing them, and the like can be exemplified.

In the present invention, a thermoplastic resin is used in the inner coat which is formed on the surface of an inner cable. Examples of the thermoplastic resin are, for instance, polybutylene terephthalate, high density polyethylene, polyoxymethylene, a fluorocarbon resin represented by polytetrafluoroethylene, a polyamide represented by 6,6-nylon, polyphenylene sulfide, and the like, but the present invention is not limited by the exemplified ones.

The polybutylene terephthalate is excellent in thermal resistance, oil resistance and abrasion resistance, and has a low coefficient of friction. The polybutylene terephthalate also has a characteristic that the difference of the initial load efficiency and the load efficiency after the control cable is operated for a long period of time is small. The smaller the melt index of the polybutylene terephthalate is, the greater the durability such as abrasion resistance and stress-cracking resistance is, but it tends to be difficult for carrying out the extrusion molding. Accordingly, it is preferable that the melt index is at least 0.1 g/10 minutes. Also, when the melt index is too large, the polybutylene terephthalate lacks toughness and cracks are generated in the inner coat, and the liner is often broken when the inner coat is rapidly bent in the assembling process of a control cable. Accordingly, it is preferable that the melt index is at most 5 g/10 minutes.

As the examples of the polybutylene terephthalate, ones used in the liner can be exemplified.

The high density polyethylene has a density of at least 0.95 g/cm$^3$. The high density polyethylene has excellent physical properties such as high load efficiency. When the melt index of the high density polyethylene is less than 0.01 g/10 minutes, the extrusion molding becomes difficult, and there is a tendency that the inner coat cannot be fixed on a stranded steel wire. When the melt index is more than 5 g/10 minutes, there is a tendency that oil resistance, stress cracking resistance and abrasion resistance deteriorate. Accordingly, it is preferable that the melt index is 0.01 to 5 g/10 minutes. The melt index is measured at a temperature of 190° C and under a load of 2.16 Kgf.

The polyoxymethylene is excellent in abrasion resistance and has a low abrasion coefficiency. The polyoxymethylene also has properties such as low stickslip under a high load and improves the operationability of a control cable. When the melt index of the polyoxymethylene is less than 0.5 g/10 minutes, moldability deteriorates because there is a necessity to heat the polyoxymethylene to nearby a temperature of the thermal decomposition. When the melt index is more than 5 g/10 minutes, there is a tendency that bending strength, impact resistance and abrasion resistance deteriorate. Accordingly, it is preferable that the melt index is 0.5 to 5 g/10 minutes. The melt index is measured at a temperature of 190° C and under a load of 2.16 Kgf. Representative examples of the polyoxymethylene are, for instance, DELRIN commercially available from Du Pont, Celcon commercially available from Hoechst Celanese, and the like.

The fluorocarbon resin shows excellent sliding characteristics at a temperature of −40° to 200° C. Examples of the fluorocarbon resin are, for instance, polytetrafluoroethylene, tetrafluoroethyleneperfluoroalkylvinyl ether copolymer, tetrafluoroethylenehexafluoropropylene copolymer, ethylenetetrafluoroethylene copolymer, polyvinylidene fluoride, polychlorotrifluoroethylene, and the like. Among them, polytetrafluoroethylene, tetrafluoroethyleneperfluoroalkylvinyl ether copolymer and tetrafluoroethylene-hexafluoroethylene copolymer, in particular, polytetrafluoroethylene are preferably used because they are excellent in thermal resistance, load efficiency and flexibility.

The polytetrafluoroethylene cannot be applied to extrusion molding because the polytetrafluoroethylene has a high melting point (327° C.) and extremely high melt viscosity. Accordingly, when an inner coat is produced from the polytetrafluoroethylene, so-called a paste-extrusion method is employed. When the paste-extrusion method is employed, it is preferable that paste is prepared by adding kerosene to polytetrafluoroethylene powder and kneading them, the paste is extruded to give a tube under high pressure and a stranded steel wire is coated with the tube, and after that, the stranded steel wire is dried and baked in a furnace such as an electric furnace.

The tetrafluoroethylene perfluoroalkylvinyl ether copolymer and the tetrafluoroethylenepentafluoroproylene copolymer can be employed in an extrusion molding by heating to melt. The tetrafluoroethyleneperfluoroalkylvinyl ether copolymer is prescribed in ASTM D 3307, and has two types, i.e. Type I and Type II.

The Type II has a polymerization degree greater than the Type I, and is excellent in stress-cracking resistance. Although melt viscosity of the Type II is 6 to 7 times greater than that of the Type I, the Type II is suitable for uses necessitating durability because the type II can be employed in an extrusion molding. Representative examples of the Type II are, for instance, Teflon (Registered Trademark) PFA 340-J commercially available from DUPONT-MITSUI FLUORO CHEMICALS CO., LTD., and the like.

The tetrafluoroethylene-hexafluoropropylene copolymer is prescribed in ASTM D 2116, and has four types, i.e. Type I to Type IV. The polymerization degrees of these types are different respectively. It is preferable to use the Type III and Type IV because the Type I and Type II having a small polymerization degree are poor in stress-cracking resistance. Representative examples of the Type III are, for instance, Teflon FEP160 commercially available from DUPONT-MITSUI FLUORO CHEMICALS CO., LTD., and the like.

Representative examples of the polyamide are, for instance; 6,6-nylon, 6-nylon, 11-nylon, 12-nylon, and the like.

The polyphenylene-sulfide is divided broadly into two groups of a crosslinked prepolymer and a linear prepolymer, and these can be used in the present invention. Since the polyphenylene sulfide is generally poor in elongation and flexibility as it is, it is preferable to use a polyphenylene sulfide containing 5 to 40% by weight of an elastomer. It is preferable that the elastomer has an ability to be modified so that a softened polyphenylene sulfide, which is prepared by mixing with the elastomer and kneading them with melting, has a flexural modulus of at most 30000 (ASTM D 790) and a tensile elongation at break of at least 5% (ASTM D 638). Representative examples of such an elastomer are, for instance, an olefin copolymer containing an epoxy group (ethylene content: 88% by weight, glycidyl methacrylate content: 12% y weight), a hydrogenated styrenebutadience copolymer (TUFTEC M 1913 commercially available from Asahi Chemical Industry Co., Ltd.), an ethylene-propylene copolymer (TAFMER PO 680 commercially available from MITSUI PETRO CHEMICAL INDUSTRIES, LTD.), and the like. As a method for forming an inner coat by using the polyphenylene sulfide, for instance, a melt-extrusion method and an electrostatic coating method of powder can be cited. As the polyphenylene sulfide which can be employed in the electrostatic coating method of powder, both of the linear polyphenylene sulfide and the crosslinked polyphenylene sulfide can be used, and if a thin film having a thickness of at most 0.1 mm can be formed, there is no necessity to add an elastomer thereto. It is necessary that the particle size of the powder is 5 to 150 $\mu$m. When the particle size of the powder is less than 5 $\mu$m, a pinholl is easily generated because the powder is agglomerated. When the particle size is more than 150 $\mu$m, a uniform thin film cannot be formed. In order to improve the adhesion property between a steel wire and the polyphenylene sulfide, it is preferable that the steel wire is previously coated with a suitable primer.

Among the thermoplastic resins used in the inner coat, polybutylene terephthalate, high density polyethylene, polyoxymethylene and polyphenylene-sulfide are particularly preferable because these are excellent in abrasion resistance. Among them, polyoxymethylene is preferably used in the present invention because a stick-slip is hardly generated when polyoxymethylene is used.

Also, as a resin of the inner coat, a thermoplastic resin in which the above-mentioned organopolysiloxane is dispersively contained can be used in the same way as in the above-mentioned liner.

Next, one embodiment of the control cable of the present invention is explained with the reference of FIG. 1.

FIG. 1 is a partially-cut-off perspective view showing one embodiment of the pull type control cable of the present invention.

In FIG. 1, 1 denotes an inner cable, 2 denotes a conduit, 3 denotes an inner coat, and 4 denotes a liner.

Seven steel wires are twisted to obtain one strand, and seven strands are twisted to obtain a wire rope with 7×7 construction and an outside diameter of 3.0 mm.

The conduit 2 is composed of an armor layer 5 and a protective layer 6 of a synthetic resin such as polypropylene. The outside of the armor 5 is covered with the protective layer 6 having a thickness of 0.7 mm. The armor layer 5 (outside diameter: 8.60 mm, inside diameter: 6.00 mm) is produced by closely coiling a steel strip having a square shape (thickness: 1.30 mm, width: 2.40 mm) in a section on the liner spirally. The inner coat 3 of which thickness is about 0.35 mm is coated on the outside surface of the inner cable 1. The outside diameter of the inner coat 3 is 3.7 mm. The liner 4 having an inside diameter of 4.6 mm and an outside diameter of 5.6 mm is formed on the inside surface of the conduit 2.

A clearance of 0.9 mm in diameter is remained between the outside of the inner coat 3 and the inside of the liner 4.

The number of the strands used in the inner cable 1 and the number of the steel wires used in the strand are not particularly limited, and conventionally known various combination thereof can be employed.

Also, instead of the armor layer 5, the conduit 2 may have a shield layer, which is produced by wrapping plural metallic wires or synthetic resin wires on the liner 4 helically with a long lead. In the protective layer 6, various materials conventionally known such as polypropylene and polyvinyl chloride can be used.

The present invention can be applied to any type of control cables provided that the inner coat 3 is formed on the outside surface the inner cable 1 and that the liner 4 is formed on almost all of the inside surface of the conduit 2, and the present invention is not restricted by the constitution of the inner cable 1 and the conduit 2.

As mentioned above, since the control cable of the present invention does not necessitate a lubricant, a problem concerning workability for coating a lubricant is solved and irregurality of load efficiency of products due to the uneveness of coating is not generated. Also, since a liner containing a specific organopolysiloxane is used in the control cable of the present invention, excellent load efficiency is continued for a long period of time.

Hereinafter, the control cable of the present invention and the technical effect are explained in detail with comparing some examples and comparative examples.

EXAMPLES 1 TO 26 AND COMPARATIVE EXAMPLE 1 TO 20

As an organopolysiloxane having an ultra-high viscosity, dimethylpolysiloxane having a kinematic viscosity of 3,000,000 cSt at 25° C was used. Some organopolysiloxanes composed of the components shown in Tables 1 to 4 were prepared by mixing the above dimethylsiloxane with dimethylpolysiloxane having a kinematic viscosity shown in Tables 1 to 4.

A thermoplastic resin shown in Tables 1 to 4 was heated to melt, and the organopolysiloxane obtained in the above was added thereto in a proportion shown in Tables 1 to 4. After they were uniformly kneaded, a liner having an inside diameter of 4.6 mm and an outside diameter of 5.6 mm was molded.

Next, the liner was inserted into a conduit having a protective layer made of polypropylene of 0.7 mm in thickness on the outside surface of a springy armor layer having an outside diameter of 8.6 mm.

An inner coat made of a thermoplastic resin shown in Tables 1 to 4 having an outside diameter of 3.7 mm was coated onto the outside surface of the inner cable (outside diameter: 3 mm)

With respect to Examples 12 to 15 and Comparative Examples 12 to 14, in accordance with a paste-extrusion method, 18 parts by weight of kerosene was added to 100 parts by weight of polytetrafluoroethylene powder (average particle size 25 μm) and kneaded to give paste, and the paste was extruded under high pressure to give a tube. After a steel wire was coated with the tube, the steel wire was heated to dry at 200° C. in an electric furnace and baked at 385° C. to form an inner coat. With respect to Example 22, after a primer FP-001 commercially available from CHUKOH CHEMICAL INDUSTRIES, LTD. was coated on a steel wire and polyphenylene surfide powder was sprayed onto the surface of the steel wire with a gun for electrostatic coating, the steel wire was heated to 350° C. to form a coating film.

Next, the inner cable was introduced into the conduit to obtain a control cable.

As the physical properties of the control cable, load efficiency was measured in accordance with the following method. The results are shown in Tables 1 to 4.

[Load efficiency]

Figure 2:
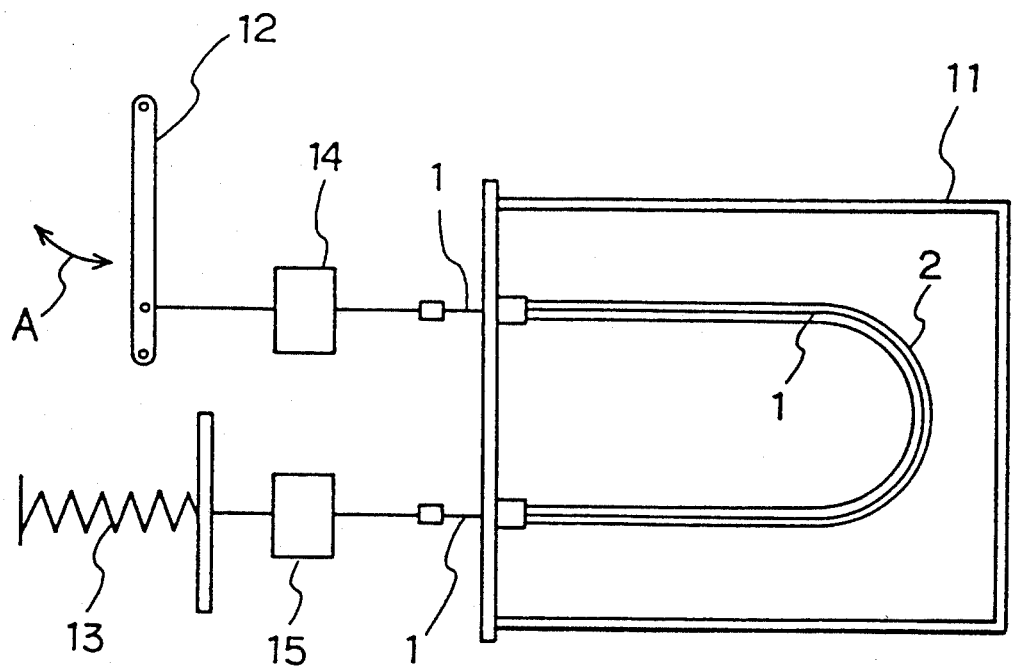
FIG. 2 is an illustrative view of an apparatus for measuring the properties of the control cable of the present invention.

An apparatus for measuring load efficiency is explained hereinafter based upon FIG. 2. A control cable for test (inner cable length: 1000 mm, conduit length: 700 mm) was curved for 180° with a bending radius of 150 mm in U shape, and fixed in a thermostatic box 11.

A lever 12 was connected with the inner cable 1 at the input end, and a spring 13 was connected with the inner cable 1 at the output end so that a load is applied to the control cable. A load cell 14 was connected with the inner cable 1 on the way at the input side, and another load cell 15 was connected with the inner cable 1 on the way at the out put side.

The load efficiency was measured at a prescribed temperature (room temperature (23° C.) or 130° C.) in the thermostatic box 11 in accordance with the following method.

The lever 12 was swayed in the direction of an arrow A, and one back and forth of the inner cable 1 was counted as one stroke. The inner cable 1 was gone there and back 60 strokes per one minute. The stroke of the spring was 0 to 30 mm, a load of 50 kgf was applied to the inner cable 1.

The load efficiency was calculated in accordance with the formula: $(W/F) \times 100$ (%) when the applied load was 50 kgf at the output end. In the formula, F denotes a value of a load cell at the input end and W denotes a value of a load cell at the output end.

The initial load efficiency and the load efficiency after the sliding motion was repeated 1,000,000 times were measured.

TABLE 1

| | | Liner | | | | Physical properties of control cable | | | |
| | | Organopolisiloxane | | | | | | | |
| | | Components | | | | | | | |
| | | | | Dimethyl-polysiloxane having a lower density | | | Initial load efficiency | | Load efficiency after sliding motion was repeated 1,000,000 times | |
| | Thermo-plastic resin | Content in thermo-plastic resin (% by weight) | Content of dimethyl-polysiloxane having an ultra-high viscosity (% by weight) | Content (% by weight) | Kinematic viscosity | Inner coat Thermoplastic resin | Room temp. | 130° C. | Room temp. | 130° C. |
| Ex. No. | | | | | | | | | | |
| Ex. 1 | PBT-1*1 | 15 | 70 | 30 | 500 | PBT-1 | 87.1 | 87.8 | 81.2 | 77.9 |
| Ex. 2 | PBT-1 | 15 | 80 | 20 | 5000 | PBT-1 | 86.7 | 87.0 | 80.1 | 77.0 |
| Ex. 3 | PBT-1 | 18 | 50 | 50 | 50 | PBT-1 | 87.3 | 88.1 | 78.4 | 76.3 |
| Ex. 4 | PBT-1 | 18 | 50 | 50 | 5000 | PBT-1 | 88.0 | 88.2 | 81.8 | 78.6 |
| Ex. 5 | PBT-1 | 15 | 70 | 30 | 500 | PBT-2*5 | 88.4 | 88.7 | 82.1 | 78.0 |
| Com. Ex. 1 | PBT-1 | 10 | 70 | 30 | 500 | PBT-1 | 84.0 | 84.9 | 63.0 | 54.6 |
| Com. Ex. 2 | PBT-1 | 0 | — | — | — | PBT-1 | 75.0 | 70.2 | —*2 | —*2 |
| Com. Ex. 3 | PBT-1 | 15 | 100 | 0 | — | PBT-1 | 85.1 | 85.0 | 75.5 | 71.7 |
| Com. Ex. 4 | PBT-1 | 0 | — | — | — | PBT-2 | 86.0 | 86.5 | 60.8 | 55.3 |
| Ex. 6 | 66-PA*3 | 15 | 70 | 30 | 500 | PBT-1 | 84.3 | 86.7 | 73.0 | 70.2 |
| Com. Ex. 5 | 66-PA | 0 | — | — | — | PBT-1 | 73.1 | 74.9 | —*2 | —*2 |
| Com. Ex. 6 | 66-PA | 15 | 100 | 0 | — | PBT-1 | 82.1 | 86.2 | 47.3 | 50.5 |
| Ex. 7 | POM*4 | 13 | 70 | 30 | 500 | 66-PA | 80.2 | 83.5 | 76.8 | 75.4 |
| Com. Ex. 7 | POM | 0 | — | — | — | 66-PA | 72.4 | 73.7 | —*2 | —*2 |
| Com. Ex. 8 | POM | 15 | 100 | 0 | — | 66-PA | 78.4 | 81.7 | 55.0 | 56.8 |
| Ex. 8 | PBT-1*1 | 15 | 70 | 30 | 500 | POM*4 | 90.8 | 98.2 | 87.5 | 86.8 |
| Ex. 9 | PBT-1 | 15 | 80 | 20 | 5000 | POM | 90.1 | 91.1 | 86.4 | 85.5 |
| Ex. 10 | PBT-1 | 18 | 50 | 50 | 50 | POM | 91.0 | 90.4 | 87.5 | 85.9 |
| Ex. 11 | PBT-1 | 18 | 50 | 50 | 5000 | POM | 90.7 | 88.5 | 86.8 | 85.2 |
| Com. Ex. 9 | PBT-1 | 10 | 70 | 30 | 500 | POM | 90.5 | 89.0 | 75.5 | 62.0 |
| Com. Ex. 10 | PBT-1 | 0 | — | — | — | POM | 81.5 | 77.2 | —*2 | —*2 |
| Com. Ex. 11 | PBT-1 | 15 | 100 | 0 | — | POM | 88.2 | 84.7 | —*6 | —*6 |

TABLE 2

| | | Liner | | | | | | | | |
|---|---|---|---|---|---|---|---|---|---|---|
| | | Organopolisiloxane | | | | | Physical properties of control cable | | | |
| | | | Components | | | | | | | |
| | | | | Dimethyl-polysiloxane having a lower density | | | | | Load efficiency after sliding motion was repeated 1,000,000 times | |
| | | Content in thermoplastic resin (% by weight) | Content of dimethyl-polysiloxane having an ultra-high viscosity (% by weight) | | | Inner coat | Initial load efficiency | | | |
| Ex. No. | Thermoplastic resin | | | Content (% by weight) | Kinematic viscosity | Thermoplastic resin | Room temp. | 130° C. | Room temp. | 130° C. |
| Ex. 8 | PBT-1[*1] | 15 | 70 | 30 | 500 | POM[*4] | 90.8 | 98.2 | 87.5 | 86.8 |
| Ex. 9 | PBT-1 | 15 | 80 | 20 | 5000 | POM | 90.1 | 91.1 | 86.4 | 85.5 |
| Ex. 10 | PBT-1 | 18 | 50 | 50 | 50 | POM | 91.0 | 90.4 | 87.5 | 85.9 |
| Ex. 11 | PBT-1 | 18 | 50 | 50 | 5000 | POM | 90.7 | 88.5 | 86.8 | 85.2 |
| Com. Ex. 9 | PBT-1 | 10 | 70 | 30 | 500 | POM | 90.5 | 89.0 | 75.5 | 62.0 |
| Com. Ex. 10 | PBT-1 | 0 | — | — | — | POM | 81.5 | 77.2 | —[*2] | —[*2] |
| Com. Ex. 11 | PBT-1 | 15 | 100 | 0 | — | POM | 88.2 | 84.7 | —[*6] | —[*6] |
| Ex. 12 | PBT-1 | 15 | 70 | 30 | 500 | PTFE[*7] | 90.6 | 87.3 | 79.6 | 76.8 |
| Ex. 13 | PBT-1 | 15 | 80 | 20 | 5000 | PTFE | 90.1 | 88.2 | 78.2 | 77.9 |
| Ex. 14 | PBT-1 | 18 | 50 | 50 | 50 | PTFE | 91.2 | 88.0 | 75.1 | 73.5 |
| Ex. 15 | PBT-1 | 18 | 50 | 50 | 5000 | PTFE | 89.2 | 86.4 | 75.8 | 72.9 |
| Com. Ex. 12 | PBT-1 | 10 | 70 | 30 | 500 | PTFE | 90.2 | 87.0 | 61.3 | 55.8 |
| Com. Ex. 13 | PBT-1 | 0 | — | — | — | PTFE | 85.5 | 82.7 | —[*2] | —[*2] |
| Com. Ex. 14 | PBT-1 | 15 | 100 | 0 | — | PTFE | 89.6 | 86.0 | —[*8] | —[*8] |

TABLE 3

| | | Liner | | | | | | | | |
|---|---|---|---|---|---|---|---|---|---|---|
| | | Organopolisiloxane | | | | | Physical properties of control cable | | | |
| | | | Components | | | | | | | |
| | | | | Dimethyl-polysiloxane having a lower density | | | | | Load efficiency after sliding motion was repeated 1,000,000 times | |
| | | Content in thermoplastic resin (% by weight) | Content of dimethyl-polysiloxane having an ultra-high viscosity (% by weight) | | | Inner coat | Initial load efficiency | | | |
| Ex. No. | Thermoplastic resin | | | Content (% by weight) | Kinematic viscosity | Thermoplastic resin | Room temp. | 130° C. | Room temp. | 130° C. |
| Ex. 16 | PBT-1[*1] | 15 | 70 | 30 | 500 | PFA[*9] | 91.1 | 87.9 | 77.7 | 74.6 |
| Ex. 17 | PBT-1 | 15 | 70 | 30 | 500 | FEP[*10] | 90.5 | 86.3 | 76.5 | 73.1 |
| Ex. 18 | PBT-1 | 15 | 70 | 30 | 500 | PPS[*11] | 92.2 | 91.3 | 74.3 | 71.4 |
| Ex. 19 | PBT-1 | 15 | 80 | 20 | 5000 | PPS | 92.9 | 92.0 | 72.1 | 70.8 |
| Ex. 20 | PBT-1 | 18 | 50 | 50 | 50 | PPS | 92.1 | 91.5 | 73.8 | 71.2 |
| Ex. 21 | PBT-1 | 18 | 50 | 50 | 5000 | PPS | 92.5 | 91.8 | 70.3 | 70.9 |
| Ex. 22 | PBT-1 | 15 | 70 | 30 | 500 | PPS powder[*12] | 92.6 | 92.0 | 76.2 | 72.5 |
| Com. Ex. 15 | PBT-1 | 10 | 70 | 30 | 500 | PPS | 92.2 | 91.5 | 54.3 | 51.0 |
| Com. Ex. 16 | PBT-1 | 0 | — | — | — | PPS | 80.3 | 78.2 | —[*2] | —[*2] |
| Com. Ex. 17 | PBT-1 | 15 | 100 | 0 | — | PPS | 91.8 | 90.5 | —[*8] | —[*8] |

TABLE 4

| | | Liner | | | | | | | | |
|---|---|---|---|---|---|---|---|---|---|---|
| | | Organopolisiloxane | | | | | Physical properties of control cable | | | |
| | | | Components | | | | | | | |
| | | | | Dimethyl-polysiloxane having a lower density | | | | | Load efficiency after sliding motion was repeated 1,000,000 times | |
| | | Content in thermoplastic resin (% by weight) | Content of dimethyl-polysiloxane having an ultra-high viscosity (% by weight) | | | Inner coat | Initial load efficiency | | | |
| Ex. No. | Thermoplastic resin | | | Content (% by weight) | Kinematic viscosity | Thermoplastic resin | Room temp. | 130° C. | Room temp. | 130° C. |
| Ex. 23 | PBT-1[*1] | 15 | 70 | 30 | 500 | PE[*13] | 84.7 | 87.7 | 78.4 | 75.3 |
| Ex. 24 | PBT-1 | 15 | 80 | 20 | 5000 | PE | 86.8 | 87.2 | 76.3 | 73.8 |
| Ex. 25 | PBT-1 | 18 | 50 | 50 | 50 | PE | 87.8 | 88.1 | 75.2 | 75.0 |
| Ex. 26 | PBT-1 | 18 | 50 | 50 | 5000 | PE | 86.0 | 85.5 | 73.8 | 74.2 |
| Com. Ex. 18 | PBT-1 | 10 | 70 | 30 | 500 | PE | 87.3 | 87.5 | 63.1 | 59.8 |
| Com. Ex. 19 | PBT-1 | 0 | — | — | — | PE | 82.3 | 80.6 | —[*2] | —[*2] |

TABLE 4-continued

| | | Liner | | | | | Physical properties of control cable | | | |
|---|---|---|---|---|---|---|---|---|---|---|
| | | Organopolisiloxane | | | | | | | | |
| | | Components | | | | | | | | |
| | | | | Dimethyl-polysiloxane having a lower density | | | | | Load efficiency after sliding motion was repeated 1,000,000 times | |
| | | Content in thermoplastic resin (% by weight) | Content of dimethyl-polysiloxane having an ultra-high viscosity (% by weight) | | | Inner coat | Initial load efficiency | | | |
| Ex. No. | Thermoplastic resin | | | Content (% by weight) | Kinematic viscosity | Thermoplastic resin | Room temp. | 130° C. | Room temp. | 130° C. |
| Com. Ex. 20 | PBT-1 | 15 | 100 | 0 | — | PE | 86.0 | 85.8 | —*6 | —*6 |

In Tables 1 to 4, *1 to *13 mean the followings.
*1: Polybutylene terephthalate (PBT 1401 × 04 commercially available from Toray Industries, Inc.)
*2: Both of liner and inner coat were completely worm after 50,000 strokes.
*3: 6,6-nylon (LEONA 1702 commercially available from Asahi Chemical Industry Co., Ltd.)
*4: Polyoxymethylene (DURACON M25-34 commercially available from POLYPLASTICS CO., LTD.)
*5: Thermoplastic resin for inner coat: polybutylene terephthalate containing 15% by weight of an organopolysiloxane composed of 70% by weight of dimethylpolysiloxane having an ultra-high viscosity of which kinematic viscosity is 3,000,000 cSt (at 25° C.) and 30% by weight of dimethylpolysiloxane of which kinematic viscosity is 500 cSt (at 25° C.).
*6: Both of liner and inner coat were completely worm after 500,000 strokes.
*7: Polytetrafluoroethylene (NITRO FLON No. 9307 commercially available from NITTO DENKO CORPORATION)
*8: Both of liner and inner coat was completely worm after 300,000 strokes.
*9: Tetrafluoroethylene-perfluoroalkylvinyl ether copolymer (TEFLON PFA340J commerically available from DUPONT-MITSUI FLUORO CHEMICALS CO., LTD.)
*10: Tetrafluoroethylene-hexafluoropropylene copolymer (TEFLON FEP160 commercially available from DUPONT-MITSUI FLUORO CHEMICALS CO., LTD.)
*11: Polyphenylene sulfide [a linear polyphenylene sulfide having a melt viscosity of 2500 poise at a temperature of 320° C. under a shear rate of 10 sec$^{-1}$ was treated with an aqueous solution of acetic acid of pH4 at 90° C., and melt-blended in an extruder with an ethylene-glycidyl methacrylate copolymer (ethylene content: 88% by weight) in a weight ratio of 80:20]
*12: Polyphenylene sulfide (The inner coat was formed by coating a powder having an average particle size of 25 μm composed of 90% by weight of polyphenylene sulfide and 10% by weight of polytetrafluoroethylene and baking it at 350° C.)
*13: High density polyethylene (SHOLEX 6002B commercially available from SHOWA DENKO K.K.)

As is clear from the results shown in Tables 1 to 4, the control cables of the present invention produced in Examples are excellent in initial load efficiency and load efficiency after the operation was carried out 1,000,000 times in comparison with the control cables produced in Comparative Examples when both the kind of the thermoplastic resin used in the liner in Examples and that in Comparative Examples are the same.

Also, it can be seen that the control cable produced in Comparative Examples, in which organopolysiloxane was contained only in the thermoplastic resin of the inner coat, has low durability. Further, it can be seen that the control cable produced in Example 5, in which organopolysiloxane was dispersively contained in thermoplastic resins of both the liner and the inner coat, has physical properties almost equal to the control cables produced in other Examples, in which organopolysiloxane was dispersively contained only in the thermoplastic resin of the liner.

Further, it can be seen that the initial load efficiency is improved when the thermoplastic resin used in the inner coat is polybutylene terephthalate having a melt index of 0.1 to 5 g/10 minutes, polyoxymethylene having a melt index of 0.01 to 5 g/10 minutes, polyphenylene sulfide, high density polyethylene having a melt index of 0.01 to 5 g/10 minutes or a fluorocarbon resin.

Since the control cable of the present invention does not necessitate a lubricant which is necessitated in conventional control cables, there is no problem as to workability for coating a lubricant such as generation of drip and irregularity of physical properties due to the uneveness of the coat of the lubricant is not generated.

Also, since the control cable of the present invention is excellent in initial load efficiency and load efficiency after the control cable is repeatedly used, sliding operation of the inner cable can be smoothly carried out for a long period of time.

Though several embodiments of the invention are described above in detail, it is to be understood that the present invention is not limited to the abovementioned embodiments, and various changes and modifications may be made in the invention without departing from the spirit and scope thereof.

What is claimed is:

1. A control cable comprising a flexible conduit having an inner surface; a liner fitting into the inner surface of the flexible conduit; and an inner cable having an inner coat, the inner cable being disposed within and freely sliding within the liner; wherein the inner coat comprises a first thermoplastic resin and the liner comprises a second thermoplastic resin, and the second thermoplastic resins has dispersed therein 13 to 20% by weight of a lubricating organopolysiloxane, wherein the lubricating organopolysiloxane comprises about 45 to 85% by weight of an ultra-high viscosity organopolysiloxane having a kinematic viscosity of 1,000,000 to 50,000,000 cSt at 25° C. and about 15 to 55% by weight of a lower viscosity organopolysiloxane having a kinematic viscosity of 25 to 10,000 cSt at 25° C.

2. The control cable of claim 1, wherein at least one of said ultra-high viscosity organopolysiloxane and said lower viscosity organopolysiloxane is dimethylpolysiloxane.

3. The control cable of claim 1, wherein the thermoplastic resin is polybutylene terephthalate having a melt index of 0.1 to 5 g/10 minutes.

4. The control cable of claim 1, wherein the thermoplastic resin is polyoxymethylene having a melt index of 0.5 to 5 g/10 minutes.

5. The control cable of claim 1, wherein the first thermoplastic resin used in the inner coat is polyphenylene sulfide.

6. The control cable of claim 1, wherein the first thermoplastic resin is high density polyethylene having a melt index of 0.01 to 5 g/10 minutes.

7. The control cable of claim 1, wherein the first thermoplastic resin is a fluorocarbon resin.

8. A control cable of claim 1, wherein the first thermoplastic resin has the lubricating organopolysiloxane dispersed therein.

9. The control cable of claim 8, wherein the thermoplastic resin is polybutylene terephthalate having a melt index of 0.1 to 5 g/10 minutes.

10. A control cable comprising a flexible conduit having an inner surface; a liner fitting into the inner surface of the flexible conduit; and an inner cable having an inner coat, the inner cable being disposed within and freely sliding within the liner; wherein the inner coat comprises a first thermoplastic resign and the liner comprises a second thermoplastic resin, and one of the first and second thermoplastic resins has dispersed therein 13 to 20% by weight of a lubricating organopolysiloxane, wherein the lubricating organopolysiloxane comprises about 50 to 80% by weight of an ultra-high viscosity organopolysiloxane having a kinematic viscosity of 1,000,000 to 50,000,000 cSt at 25° C. and about 20 to 50% by weight by weight of a lower viscosity organopolysiloxane having a kinematic viscosity of 25 to 10,000 cSt at 25° C.

11. A control cable comprising a flexible conduit having an inner surface; a liner fitting into the inner surface of the flexible conduit; and an inner cable having an inner coat, the inner cable being disposed within and freely sliding within the liner; wherein the inner coat comprises a first thermoplastic resign and the liner comprises a second thermoplastic resin, and one of the first and second thermoplastic resins has dispersed therein 13 to 20% by weight of a lubricating organopolysiloxane, wherein the lubricating organopolysiloxane comprises about 45 to 85% by weight of an ultra-high viscosity organopolysiloxane having a kinematic viscosity of 2,000,000 to 10,000,000 cSt at 25° C. and about 15 to 55% by weight of a lower viscosity organopolysiloxane having a kinematic viscosity of 25 to 10,000 cSt at 25° C.

* * * * *